A. WOLLENSAK.
PHOTOGRAPHIC SHUTTER.
APPLICATION FILED FEB. 24, 1908.

990,509.

Patented Apr. 25, 1911.

7 SHEETS—SHEET 1.

WITNESSES:
Clarence W. Carroll
L. Thow.

INVENTOR:
Andrew Wollensak
by Osgood & Davis
his Attys

A. WOLLENSAK.
PHOTOGRAPHIC SHUTTER.
APPLICATION FILED FEB. 24, 1908.

990,509.

Patented Apr. 25, 1911.

7 SHEETS—SHEET 2.

WITNESSES:
Clarence W. Carroll
L. Thon.

INVENTOR:
Andrew Wollensak
by Osgood & Davis
his attys

A. WOLLENSAK.
PHOTOGRAPHIC SHUTTER.
APPLICATION FILED FEB. 24, 1908.

990,509.

Patented Apr. 25, 1911.

7 SHEETS—SHEET 3.

WITNESSES:
Clarence W. Carroll
L. Thow.

INVENTOR:
Andrew Wollensak

A. WOLLENSAK.
PHOTOGRAPHIC SHUTTER.
APPLICATION FILED FEB. 24, 1908.
990,509.
Patented Apr. 25, 1911.
7 SHEETS—SHEET 4.
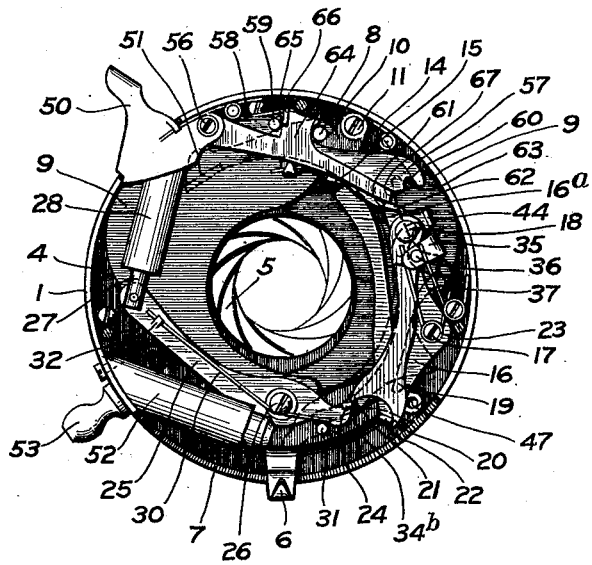
FIG. 10.
FIG. 11.
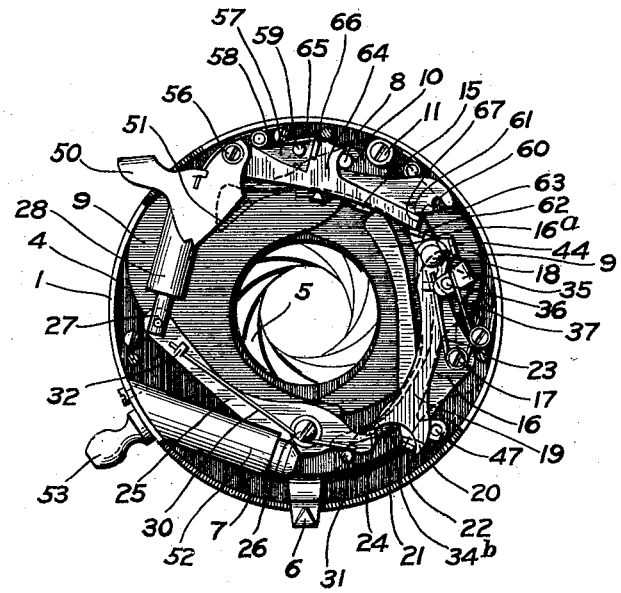
WITNESSES:
Clarence W. Carroll
L. Thon.
INVENTOR:
Andrew Wollensak
by Osgood & Davis
his Attys

A. WOLLENSAK.
PHOTOGRAPHIC SHUTTER.
APPLICATION FILED FEB. 24, 1908.

990,509.

Patented Apr. 25, 1911.
7 SHEETS—SHEET 5.

WITNESSES:
Clarence W. Carroll
L. Thow.

INVENTOR:
Andrew Wollensak
by Osgood Davis
his Attys

A. WOLLENSAK.
PHOTOGRAPHIC SHUTTER.
APPLICATION FILED FEB. 24, 1908.

990,509.

Patented Apr. 25, 1911.

7 SHEETS—SHEET 6.

WITNESSES:
Clarence W. Carroll
L. Thow.

INVENTOR:
Andrew Wollensak
by Osgood & Davis
his Attys

A. WOLLENSAK.
PHOTOGRAPHIC SHUTTER.
APPLICATION FILED FEB. 24, 1908.

990,509.

Patented Apr. 25, 1911.
7 SHEETS—SHEET 7.

WITNESSES:
Clarence W. Carroll
L. Thon

INVENTOR:
Andrew Wollensak
by Osgood & Davis
his Attys

UNITED STATES PATENT OFFICE.

ANDREW WOLLENSAK, OF ROCHESTER, NEW YORK, ASSIGNOR TO WOLLENSAK OPTICAL COMPANY, OF ROCHESTER, NEW YORK.

PHOTOGRAPHIC SHUTTER.

990,509.  Specification of Letters Patent.  Patented Apr. 25, 1911.

Application filed February 24, 1908. Serial No. 417,442.

*To all whom it may concern:*

Be it known that I, ANDREW WOLLENSAK, a citizen of the United States, and resident of Rochester, in the county of Monroe and State of New York, have invented certain new and useful Improvements in Photographic Shutters, of which the following is a specification.

This invention relates to photographic shutters, and more particularly to automatic shutters that are adapted to make "time" and "bulb" exposures, and "instantaneous" exposures of different lengths.

The object of the invention is to produce an efficient device of this character that is exceedingly compact and in which all the working parts, except parts of the regulator, pump connection and finger lever, are inclosed in the shutter casing.

A novel feature of the device resides in an arrangement whereby, upon a single movement of the indicating pointer, the shutter is thrown open and locked in that position for the purpose of focusing an image upon the ground-glass of a camera.

Figure 1:
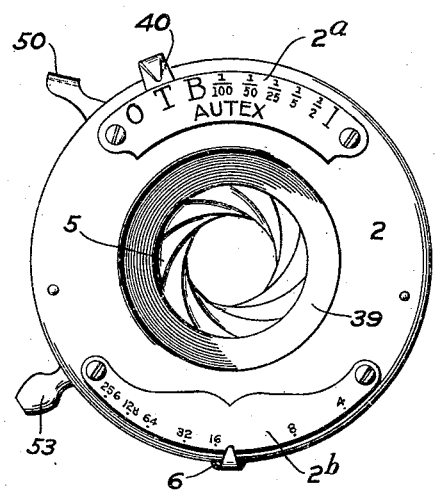
Figure 2:
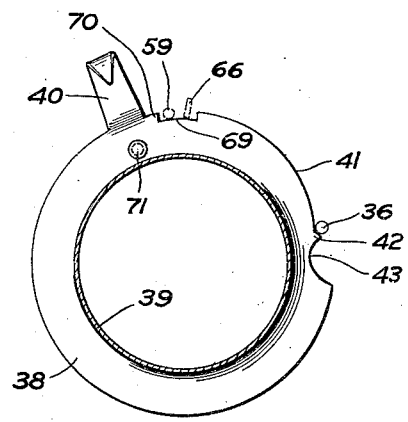
Figure 3:
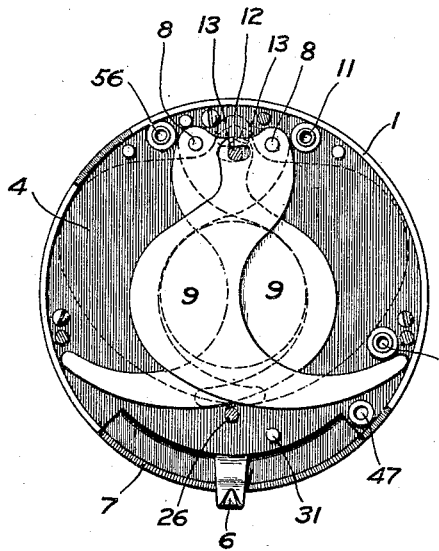
Figure 4:
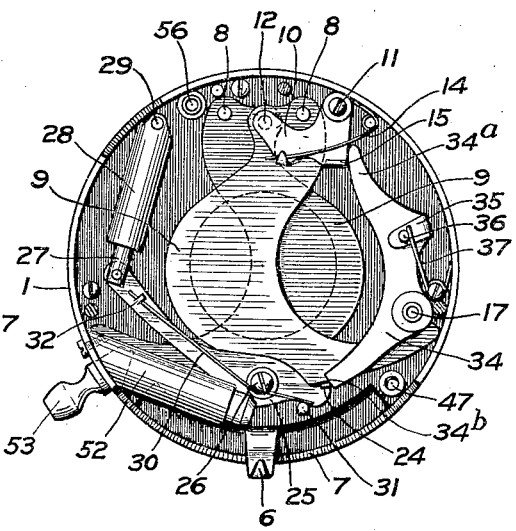
Figure 5:
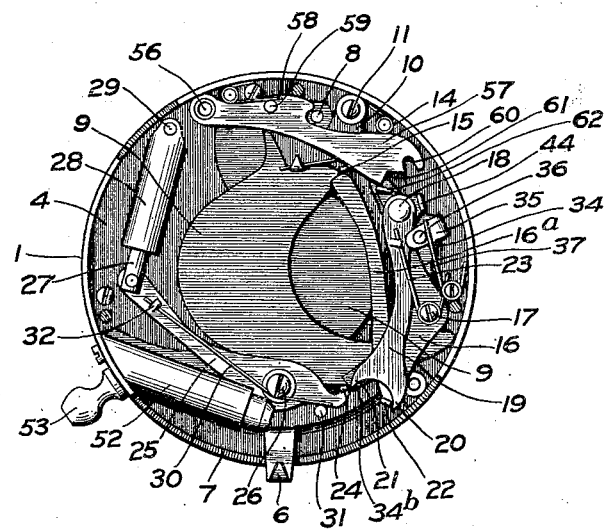
Figure 6:
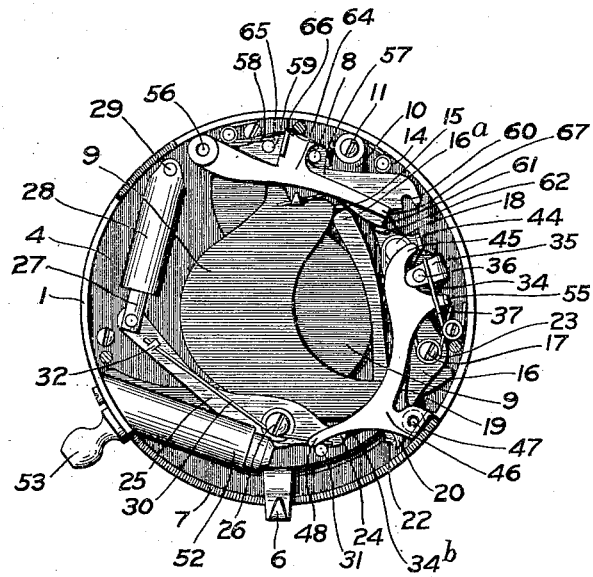
Figure 7:
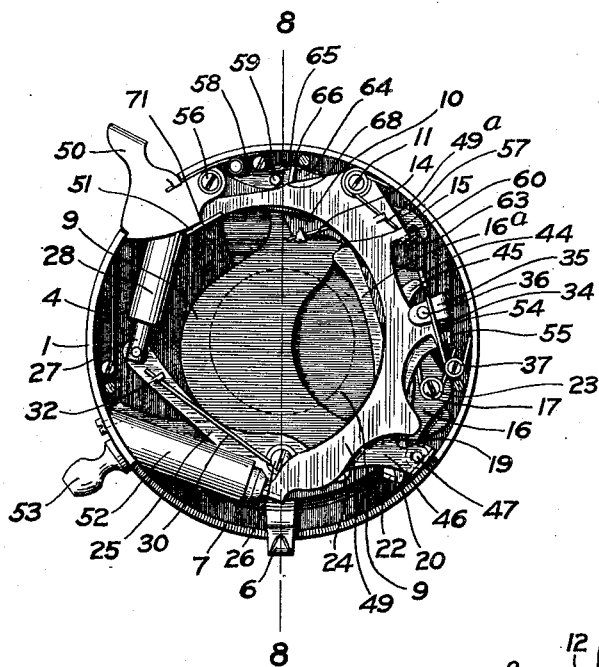
Figure 8:
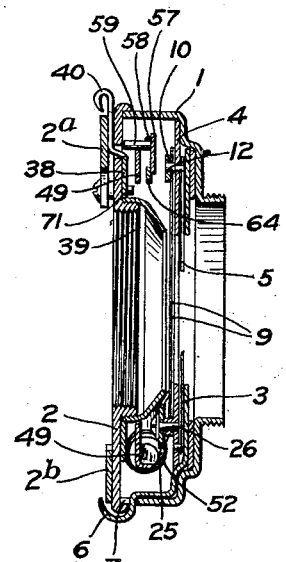
Figure 9:
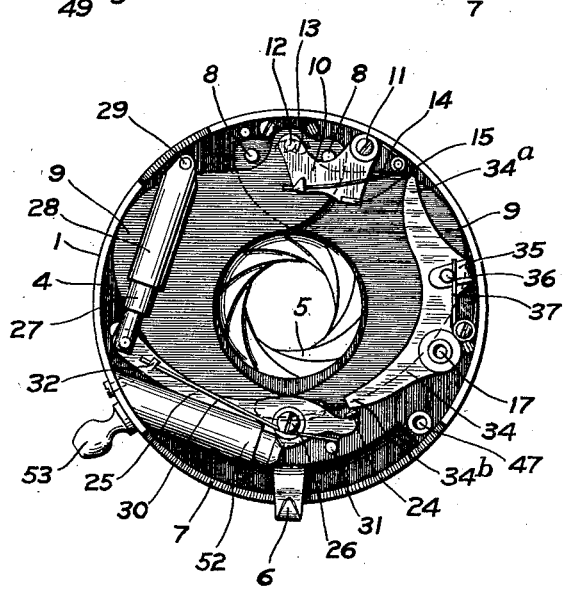
Figure 12:
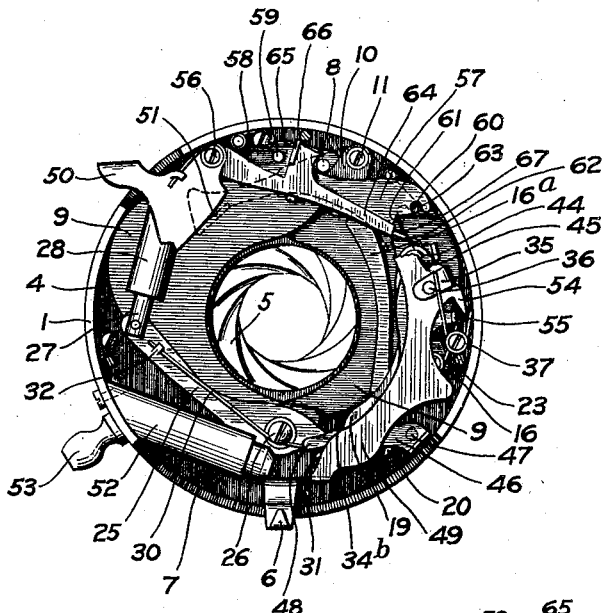
Figure 13:
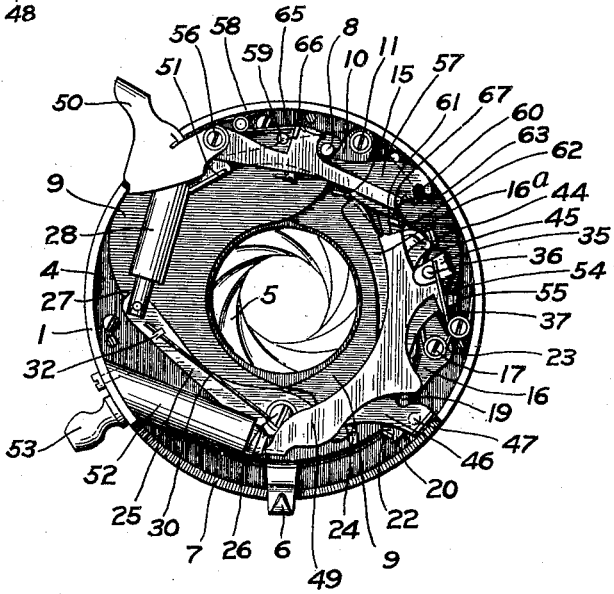
Figure 14:
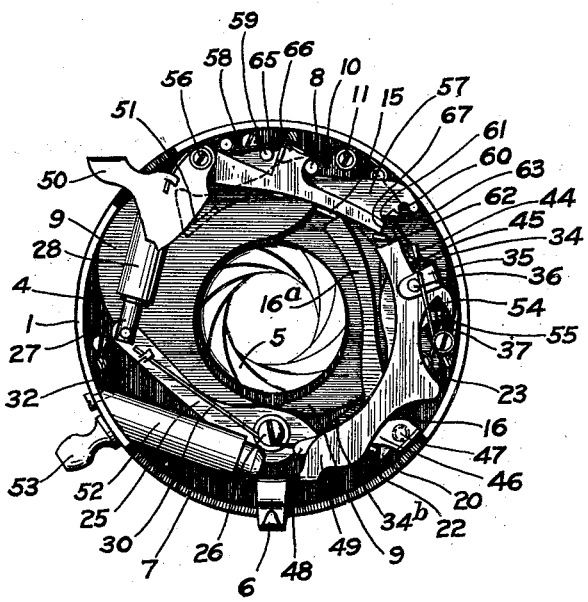
Figure 15:
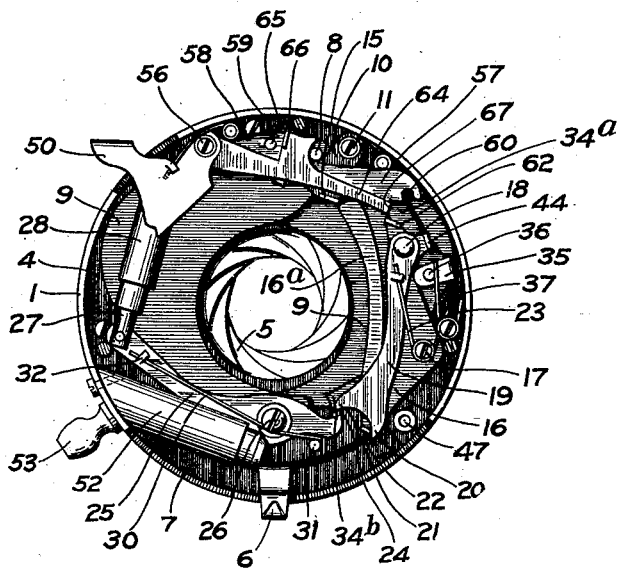
Figure 16:
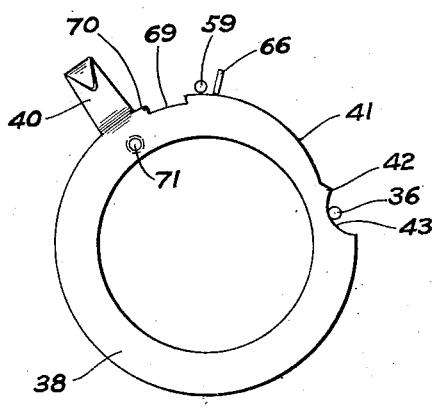
Figure 17:
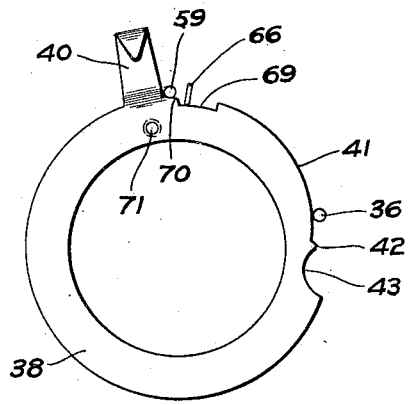
Figure 18:
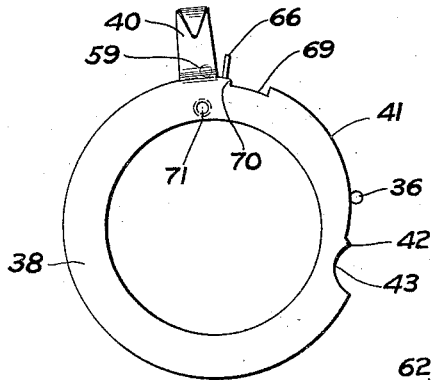
Figure 19:
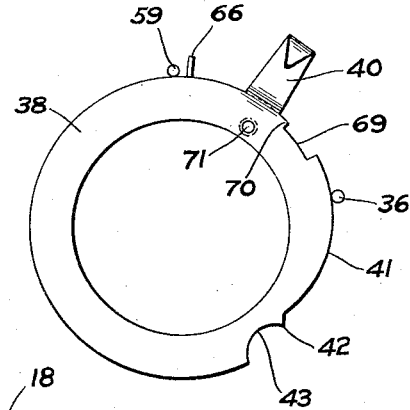
Figure 20:
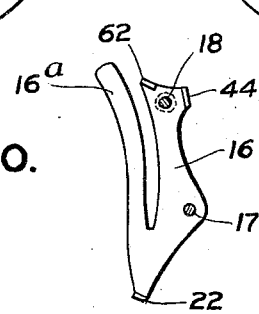

In the drawings:—Figure 1 is a front elevation of the complete mechanism; Fig. 2 is a front elevation of a part hereinafter designated as the cam plate set for a time exposure, as it would appear were the front plate of the shutter-case removed; Fig. 3 is a front view of the shutter with all the parts removed except the shutter blades; Fig. 4 is a similar view with certain parts in place which are omitted from Fig. 3; Figs. 5, 6, and 7, are similar views, with additional parts in place; Fig. 8 is a vertical section on the line 8—8 of Fig. 7; Fig. 9 is a view showing the same parts as Fig. 4, when the shutter is open during an instantaneous exposure; Fig. 10 shows the shutter after the first movement for a time exposure, certain parts being removed; Fig. 11 shows the same after the second movement for time exposure, but before the shutter has closed; Fig. 12 shows the same parts after the first movement of a "bulb" exposure; Fig. 13 shows the same parts after the finger-lever is released in a bulb exposure, but before the shutter has closed; Figs. 14 and 15 show the same parts while the shutter is closing, in instantaneous exposures of fast and slow speed, respectively; Fig. 16 shows the parts illustrated in Fig. 2, when set to hold the shutter open for focusing; Fig. 17 is the same when set for a bulb exposure; Figs. 18 and 19 are the same parts, set for fast and slow instantaneous exposures, respectively; and Fig. 20 is a front elevation of the master-lever.

The shutter casing 1 is circular, and of sufficient depth to contain all the moving parts. The front plate 2, on which are the scales $2^a$ and $2^b$, for the setting of the shutter and of the iris diaphragm, respectively, is fastened to the body (Fig. 8) of the casing 1 in any suitable manner.

Fixed to the inside of the back of the casing are two plates 3 and 4, perforated to permit passage of light through the lens. The iris diaphragm 5 is supported between these two plates, and is operated by an arm 6 which extends through a suitable slot 7 in the lower edge of the casing 1 and has an upturned end in proximity to the scale $2^b$ (Fig. 1). Projecting forwardly from the back-plate 4 are the pivots upon which are hung all the moving parts of the device.

Upon the pivots 8, 8, are supported the shutter blades 9, 9, (Fig. 3) which constitute the shutter proper. Said blades are adapted to move in opposite directions, and are operated simultaneously by the movement of the shutter lever 10 (Fig. 4) that is pivoted at 11. The lever 10 carries at its upper end a pin 12 which projects into diagonally-disposed slots 13, 13, one in the upper part of each shutter-blade 9, 9. The upward movement of the shutter lever 10 (accomplished by means about to be described), causes the blades 9, 9 to move away from each other, thus admitting light to the lens, and the downward movement of said lever, which is accomplished by the action of a spring 14, causes the blades 9, 9 to approach each other, thus cutting off light from the lens.

Upon the lower extremity of the lever 10 is a lug 15, that is adapted to be engaged by a master-lever 16 hung upon a pivot 17

(Figs. 5 and 20). The lug 15 is beveled on its front face so that as the master-lever 16 moves toward the right, the spring arm 16ª of the master-lever slides up the beveled face of said lug and no movement of the arm 10 results. On the movement of the master-lever 16 toward the left, the lug 15 is engaged by said lever, and the arm 10 is moved about its pivot 11, thus carrying the pin 12 upward and opening the blades 9, 9; and since the master-lever 16 and the shutter lever 10 are not concentric, the arm 16ª will slip off the lug 15 and release the shutter blades so that they can close under the action of the shutter spring 14.

Pivoted at 18 upon the master-lever 16 is a bar 19 (Fig. 5) hereinafter designated as the retarder-actuator. Its lower end has two points 20 and 21. The point 20 is held against a projection 22 on the master-lever 16 by means of a spring 23 that is coiled about the pivot 17. Said spring at all times tends to move said bar 19 and, therefore, the master-lever also, toward the left, which motion, if permitted to occur, causes the opening of the shutter, as before described.

The point 21 of the bar 19 is adapted, in certain positions, to engage the extremity 24 of a retarder lever 25 that is pivoted at 26. The left end of said lever 25 is pivotally attached to a plunger 27 of a dash-pot 28, which constitutes a retarder that is brought into operation during all except the shortest "instantaneous" exposures of the shutter. The dash-pot 28 swings on a pin 29, obviating the necessity of a link connection between the plunger 27 and the lever 25. A retarder motor, such as the spring 30, wound upon the pivot 26 and reacting against a pin 31, tends to pull the plunger 27 out of the dash-pot 28 by pressing against a projection 32 on the lever 25. Means which normally prevent the latter occurrence are provided as follows: On the pivot 17 (Fig. 4) is a lever 34 that has an upwardly projecting portion 35, in which is a stud 36. Said stud is acted upon by a spring 37, which tends to move the upper end or arm 34ª of the lever 34 toward the left. This motion is controlled by the cam plate before mentioned, which is clearly illustrated in Figs. 2, 16, 17, 18 and 19. Said cam plate is a ring 38, surrounding a collar 39 that is screwed upon the front plate 2. Said ring or cam plate is revolved around said collar by means of the controlling lever or indicating-pointer arm 40, which, in the present case, is integral with the ring. The greatest part of the outer periphery of the cam plate 38 is concentric with the inner periphery thereof, but a certain portion is formed into a cam curve 41, the center of which is not coincident with the center of the said plate. This curve 41 therefore constitutes a cam, which engages the stud 36 aforesaid, and moves the latter away from the center of the shutter when the controlling lever or indicating-pointer 40 is carried toward the right. When said pointer is moved toward the left, the stud 36 is held closely against the cam 41 by the action of the spring 37.

At the innermost end of the curve 41 is a slight projection 42, and beyond said projection is a notch 43, the bottom of which is much nearer to the center of the cam plate 38 than is any portion of the curve 41. If the pointer 40 is moved to the extreme left, so that it rests at "0" on the scale 2ª, the stud 36 rides over the projection 42 and is forced into the notch 43 by the action of the spring 37 (Fig. 16). When this movement occurs, the upper end 34ª of the lever 34 presses against the lug 15 of the shutter lever 10 and the latter is moved thereby, throwing open the shutter-blades 9, 9.

The lower end 34ᵇ of the lever 34 rests against the end 24 of the retarder-lever 25, as shown in Fig. 4, except when the stud 36 is moved to its outermost position by the cam 41. Thus the retarder mechanism is normally held out of operation, and the lever 34 with its lower end 34ᵇ is the retarder-controller. The action of the retarder parts, as affecting instantaneous exposures, will be described below.

The master-lever 16 has a lug 44 on its upper end, adjacent to its pivot 18, and this lug is adapted to be engaged by the upper end 45 of the trip lever 46 (Fig. 6). Said trip lever is pivoted at 47, and has an elongated lower end 48, which, by striking the stationary pin 31, limits the movement of the trip lever in one direction.

The trip lever 46 is actuated to move the master-lever 16 by means of an operating lever 49 (Fig. 7), that is pivoted upon the pin 11. Said operating lever may be moved about the pin 11 either by means of the finger-lever 50 which, when depressed, acts on the lug 51, on the operating lever 49, or by means of the pump 52, the plunger of which strikes the lower end of said lever 49, and is operated by air from a compressible bulb as usual and attached to the connecting-tip 53.

On the right side of the operating lever 49 is a downwardly-projecting tripping finger 54 (Figs. 7 and 12) that strikes a lug 55 on the trip lever 46 (see Fig. 5) when said operating lever is depressed. In this operation, the finger 54 carries the upper end of the trip lever 46 toward the right, and the latter engages the lug 44 of the master-lever 16 as before described, and carries it along in the same direction. When the operating lever reaches its limit of travel, the finger 54 slips off the upper edge of the lug 55, and the spring 23 (see Fig. 5) carries the master-lever 16, and therefore the trip lever 46 also, back toward the left (Fig. 12). Said master-lever then engages the lug 15 on the shutter arm 10, and holds the shutter-blades 9, 9 open until the lower end 48 of the trip lever 46 is stopped by the pin 31, at which point the upper end of the master-lever has moved so far that its arm $16^a$ has disengaged from the lug 15 of the shutter arm 10, and this permits the spring 14 to close the shutter-blades again.

Means are provided for the purpose of making "time" and "bulb" exposures, whereby the master-lever 16 is retained at will in such a position that the lug 15 rests upon its upper end, thereby holding the shutter-blades open until said master-lever is permitted to move farther toward the left, when it will be clear of said lug and the shutter may close.

On the pivot 56 which carries the finger-lever 50, is hung the time detent 57, normally pressed downward by a spring 58 that engages a pin 59 on the detent (Fig. 5). In the extremity of said detent is a notch 60, and below said notch is a shoulder 61, which is adapted to engage a lug 62 on the upper end of the master-lever 16, and to stop the return of the latter, so as to hold the shutter open.

Extending rearwardly from the operating lever 49 is a lug 63 (Fig. 7), which, in the normal position of said lever, rests outside of but near the notch 60 aforesaid. When said operating lever is depressed, the lug 63 enters the notch 60 (Fig. 11), and, engaging the side thereof, raises the time detent 57 against the action of the spring 58, and prevents said detent from stopping the return of the master-lever 16.

The bulb detent 64 is hung upon the pivot 56, in front of the time detent 57, and is normally pressed downward by a spring 65 that engages a lug 66 on the same. The end 67 of the bulb detent 64 is adapted to engage the lug 62 on the master-lever 16 when depressed by the spring 65. Normally, however, said bulb detent is held up to the position shown in Fig. 6 by means of a shoulder 68 on the operating lever 49 that supports the lug 66. When said operating lever is depressed, the said shoulder 68 moves downward, and the spring 65 presses the bulb detent 64 downward also. As the operating lever 49 is returned to normal position (Fig. 7), by means of the spring $49^a$, the shoulder 68 thereon strikes the under side of the projection 66, and raises the end 67 of the bulb detent out of the path of the lug 62 on the master-lever 16.

The cam plate 38 has in its edge, near the indicating-pointer 40, a notch 69. When the pointer 40 is at "T" on the scale, the pin 59 on the time detent and the projection 66 on the bulb detent both rest in said notch (Fig. 2), and the detents 57 and 64 may then operate as described. If the pointer 40 is moved to "B" on the scale, the pin 59 rides up on the periphery of the cam plate at 70, and the time detent is thus held up and out of normal operation (Fig. 17). Further movement of the pointer 40 to "1/100" on the scale brings the portion 70 under the projection 66 on the time detent 64 (Fig. 18), and thus raises the latter out of the path of the lug 62 on the master-lever 16, as before described.

The operation of the parts for a "time exposure" is as follows: The pointer 40 is moved to "T" on the scale $2^a$. The finger-lever 50 being depressed, strikes the lug 51 and moves the operating lever 49 about its pivot 11, causing the tripping finger 54 to engage the lug 55 on the trip lever 46. Said trip lever is thus swung toward the right, and its upper end 45 presses against the lug 44 on the master-lever 16 and so moves the latter in the same direction. The upper end of said master-lever slips over the beveled edge of the lug 15 on the shutter lever 10, and continues its motion until the tripping finger 54 slips past the lug 55. When this occurs, the spring 23 throws the master-lever 16 toward the left, and the upper end thereof strikes the right side of the lug 15 and opens the shutter-blades 9, 9. During this first downward movement of the finger-lever 50, the lug 63 on the operating lever engages the time detent 57 and raises it, while the shoulder 68 on said lever moves downward, allowing the spring 65 to move the end 67 of the bulb detent 64 into the path of the lug 62. The master-lever 16 is thus stopped, and the shutter held open. Upon releasing the finger-lever 50 the operating lever 49 is moved upward by means of its spring $49^a$, carrying with it the bulb detent 64, and causing the end 67 of the latter to rise out of the path of the lug 62. But this does not permit the master-lever 16 to slip from under the lug 15 on the shutter arm, for during the time that the detent 64 is being carried upward, the lug 63 on the operating lever 49 is moving downward, and the spring 58 forces the time detent 57 downward also. The shoulder 61 on the latter reaches a position where the lug 62 on the master-lever 16 rests against it, just before the end 67 of the bulb detent 64 rises out of the path of said lug, and the master-lever 16 is stopped thereby with the shutter arm 10 resting on its upper end. The shutter is thus held open, with the parts in the position shown in Fig. 10, and remains open until the lever 50 is again depressed. The second depression of the lever 50 raises the detent 57 and lowers the detent 64 as before. But the latter now falls upon the top of the lug 62, because said lug has advanced beyond the end 67. By reference to Fig. 6, it may be seen that the detent 64 projects slightly beyond the shoulder 61 on the detent 57. The detent 64 being thus rendered inoperative, and the detent 57 being carried upward by the lug 63 of the operating lever 49, there is nothing in the path of the lug 62 to prevent its further movement, and the master-lever 16 is therefore carried (by the action of the spring 23) past the bottom of the shutter lever 10 (see Fig. 11), and the spring 14 connected thereto immediately causes the shutter-blades 9, 9, to close.

When the parts are set for "bulb" exposure, the pin 59, on the time detent 57 rests upon the top of the portion 70 of the cam plate 38, thus rendering the time detent 57 inoperative by holding the shoulder 61 thereof out of the path of the lug 62 on the master-lever 16. Upon depressing the lever 50, the operating lever is moved as before, permitting the end 67 of the bulb detent 64 to move downward into the path of the lug 45 on the master-lever 16 (Fig 12). When the tripping finger 54 slips off the lug 55 of the trip lever 46, the master-lever 16 engages the lug 15 and moves the shutter lever 10, opening the blades 9, 9. The lug 62 then strikes the end of the bulb detent 64, and the master-lever is held stationary, the shutter lever 10 resting upon its upper end and retaining the shutter-blades open as long as the finger-lever 50 is held down. Immediately on the release of the said finger-lever the bulb detent 64 is carried upward by the engagement of the shoulder 68 of the operating lever with the lug 66 on said detent, and the master-lever 16 may then finish its movement, passing from under the shutter lever 10 (see Fig. 13) and permitting the blades 9, 9, to close. If the indicating-pointer 40 is placed at "1/100" on the scale 2ª, the pin 59 and the projection 66 both rest upon the top of the portion 70 of the cam plate 38, thereby holding the detents 57 and 64 out of action (Fig. 18). Upon depressing the finger lever 50, the movements of the operating lever 49, trip lever 46, and master-lever 16 occur as before, except that the latter is not stopped on its return movement, but strikes the lug 15, opening the shutter and continuing its movement until it passes from under said lug, thus causing an instantaneous opening and closing of the shutter-blades 9, 9. With the pointer 40 moved over to "1/5" or "1/2", etc., on the indicating scale, the detents 57 and 64 are still held inoperative (Fig. 19). The curved edge 41 on the cam plate 38 then forces the stud 36 outwardly. The said stud being upon the retarder-controller 34, the latter is moved therewith, and its lower end 34ᵇ rises far enough from its former position to allow the retarder lever 25 to be carried downward by the action of the spring 30. In moving downward, the long end of said lever pulls the plunger 27 part way out of the dash-pot 28. The opposite end of the retarder lever rises, and presses the lug 24 against the under side of the retarder-controller lever 34. In this position the lug 24 is in the path of the point 21 on the lower end of the retarder-actuator 19. When the master-lever 16 moves toward the right, the point 21 of the retarder-actuator slips over and rests upon the top of the lug 24, and when said master-lever moves back toward the left (which movement opens the shutter), the point 21 moves downward and depresses the short end of the retarder lever 25. The end of said lever to which the plunger 27 is attached is thus moved upward, and said plunger presses against the cushion of air in the dash-pot 28. The plunger 27 fits the dash-pot 28 rather loosely, and the air contained in said dash-pot may therefore leak out slowly past said plunger, permitting the latter to move upward slowly. The air cannot leak out fast enough, however, to allow rapid movement of the plunger. Therefore, as the point 21 on the retarder actuator 19 presses upon the lug 24 on the retarder lever 25, the short end of the lever 25 moves slowly downward, the upper end of the master-lever 16 meanwhile moving slowly toward the left and retaining the shutter-blades in open position. As soon as the point 21 slips off the extremity of the lug 24, the master-lever rapidly finishes its movement under the impulse of the spring 23, passing from under the lever 10, and the shutter blades are then closed by the spring 14.

The length of time that is required to push the plunger 27 into the dash-pot 28 is directly proportional to the extent to which it is pulled out of said dash-pot. The latter movement is determined by the position of the lower end 34ᵇ of the retarder-controller 34. The retarder-controller, as before described, is moved to affect the retarder-lever 25 by the engagement of the curve 41 on the cam plate 38 with the stud 36. As said cam plate is moved by the indicator-pointer 40, it follows that as said pointer is moved farther toward the right, the stud 36 is pushed farther away from the center of the shutter. The shutter therefore remains open longest when the pointer 40 is at the extreme right end of the scale, and remains open for a constantly decreasing interval of time as said pointer is moved back toward the left.

With the pointer 40 at the extreme left end of the scale, at the point marked "0", the shutter-blades 9, 9 are thrown open automatically, as before described, by means of the upper end 34ª of the lever 34. The shutter cannot be closed while the pointer 40 is in this position, but is locked open by means of a stud 71 on the back of the cam plate 38, which lies close against the under side of the lug 51 on the operating lever 49.

This is indicated by dotted lines in Fig. 7. In any other position of the pointer 40, the stud 71 clears the front side of said operating lever, and so is operative only in the aforementioned position.

It will be noticed that the trip lever 46 is intermediate between the master lever 16 and the operating lever 49, and that the stop for the trip lever, in its normal position of rest, is the pin 31, while the stop for the master-lever, in its normal position of rest, is the post or pin 47. When the shutter is set for one of the slower "instantaneous" speeds, the operating lever in its return movement, under the influence of its springs 49ª (see Fig. 7), does not apply any force to the master-lever that would tend to change and increase the speed of the master-lever and of the shutter, but leaves the master-lever free to act under the influence of its own spring and the retarder. The force of the operating lever in its said return movement is applied through the tripping finger 54 and the lug 55 to the trip lever 46, which may move with the operating lever independently of and away from the master-lever. The independence of the trip lever 46 produces a certainty of speed of action which could not occur if the operating lever in its return movement had any contact with the master-lever directly.

It will be noticed that there is nothing on the outside of the case of the shutter except those devices which are absolutely necessary, namely, a finger lever 50, adjusting pointers 40 for the shutter and 6 for the diaphragm, and the connection 53 for the tube of the usual pneumatic bulb. The pistons and cylinders of the retarder, and of the pneumatic releaser, are inside the case, protected from the access of dust and dirt, and thus securing a greater certainty of action than if outside the casing. This is particularly true of the retarder pump 28, which must move with uniformity, and, therefore, with perfect freedom; small particles of dust and grit in the cylinder or piston would change the retarding action, and, therefore, would vary the speed of the shutter. By protecting the retarder from dust, a greater certainty of action is provided than in the present shutters having pneumatic retarders.

What I claim is:—

1. In a photographic shutter mechanism, a spring closed shutter; a master-lever for opening the shutter having connections with the shutter including a slip-off device; a trip lever engaging the master-lever; an operating lever having a slip-off connection with the trip lever; a retarder; a retarder lever; a retarder actuator engaging the master-lever and the retarder lever; a retarder-controller for varying the action of the retarder; a bulb detent for stopping the master-lever with the shutter open; means for releasing the bulb detent upon a release action of the operating lever; a time detent for stopping the master-lever after release from the bulb detent; means for disengaging the time detent by a separate action of the operating lever; and setting means for throwing the time detent out of action, for throwing both detents out of action, for varying the action of the retarder-controller, and for locking the operating lever against action when the shutter is open for focusing.

2. In a photographic shutter mechanism, a spring closed shutter; a master-lever for opening the shutter having connections with the shutter including a slip-off device; a trip lever engaging the master-lever; an operating lever having a slip-off connection with the trip lever; a retarder; a retarder lever; a retarder actuator engaging the master-lever and the retarder lever; a retarder controller for stopping the movement of the retarder lever at variable stopping points; a bulb detent for stopping the master-lever with the shutter open; a time detent for stopping the master-lever after release from the bulb detent; means for disengaging the detents by the operating lever; and setting means for throwing one or both detents out of action and for varying the action of the retarder controller.

3. In a photographic shutter mechanism; a shutter; a spring-actuated shutter lever for closing the shutter; a master-lever for opening the shutter having a slip-off connection with the shutter lever; a trip-lever engaging the master-lever; an operating lever having a slip-off connection with the trip lever; a retarder; a retarder lever; a retarder actuator engaging the master-lever and the retarder lever; a retarder controller for varying the action of the retarder; a bulb detent for stopping the master-lever with the shutter open; means for releasing the bulb detent upon a release action of the operating lever; a time detent for stopping the master-lever after release from the bulb detent; means for disengaging the time detent by a separate action of the operating lever; and setting means for throwing the time detent out of action, for throwing both detents out of action, for varying the action of the retarder-controller, and for locking the operating lever against action when the shutter is open for focusing.

4. In a photographic shutter mechanism, a shutter, a spring actuated shutter lever for closing the shutter; a master-lever for opening the shutter having a slip-off connection with the shutter lever; a trip lever engaging the master-lever; an operating lever having a slip-off connection with the trip lever; a retarder; a retarder lever; a retarder actuator engaging the master-lever and the retarder lever; a retarder controller for stopping the movement of the retarder lever at variable stopping points; a bulb detent for stopping the master-lever with the shutter open; a time detent for stopping the master-lever after release from the bulb detent; means for disengaging the detents by the operating lever; and setting means for throwing one or both detents out of action and for varying the action of the retarder controller.

5. In a photographic shutter mechanism, a spring closed shutter, a master-lever for opening the shutter having connections with the shutter including a slip-off device; a trip lever engaging the master-lever; an operating lever having a slip-off connection with the trip lever; a retarder; a retarder motor; a retarder actuator engaging the master-lever and energizing the retarder motor; a retarder controller for varying the action of the retarder; a bulb detent for stopping the master-lever with the shutter open; a time detent for stopping the master-lever after release from the bulb detent; means for disengaging the detents from the master-lever; and setting means for throwing one or both of the detents out of action and for varying the extent of action of the retarder motor.

6. In a photographic shutter mechanism, a shutter, a spring actuated shutter lever for closing the shutter; a master-lever for opening the shutter having a slip-off connection with the shutter lever; a trip lever engaging the master-lever; an operating lever having a slip-off connection with the trip lever; a retarder; a retarder motor; a retarder actuator engaging the master-lever and energizing the retarder motor; a retarder controller for varying the action of the retarder; a bulb detent for stopping the master-lever with the shutter open; a time detent for stopping the master-lever after release from the bulb detent; means for disengaging the detents from the master-lever; and setting means for throwing one or both of the detents out of action and for varying the extent of action of the retarder motor.

7. In a photographic shutter mechanism, a shutter, a spring actuated shutter lever for closing the shutter; a master-lever provided with a spring arm having a slip-off connection with said shutter lever, for opening the shutter by movement in one direction; a trip lever engaging the master-lever for moving it in the other direction; an operating lever having a slip-off connection with the trip lever for moving it in the last mentioned direction; a bulb detent for stopping the master-lever with the shutter open; a time detent for stopping the master-lever after release from the bulb detent; means for disengaging the bulb detent upon a release action of the operating lever; means for disengaging the time detent by a separate action of the operating lever; and setting means for throwing the time detent out of action, and for throwing both detents out of action.

8. In a photographic shutter mechanism, a shutter, a spring actuated shutter lever for closing the shutter; a master-lever provided with a spring arm having a slip-off connection with said shutter lever, for opening the shutter by movement in one direction; a trip lever engaging the master-lever for moving it in the other direction; an operating lever having a slip-off connection with the trip lever for moving it in the last mentioned direction; a bulb detent for stopping the master-lever with the shutter open; a time detent for stopping the master-lever after release from the bulb detent; means for disengaging the bulb detent upon a release action of the operating lever; means for disengaging the time detent by a separate action of the operating lever; setting means for throwing the time detent out of action, and for throwing both detents out of action; a retarder; a retarder lever; a retarder actuator engaging the master-lever and the retarder lever; a retarder controller for varying the action of the retarder; and means moving with said setting means for varying the action of the retarder controller.

9. In a photographic shutter mechanism, a shutter, means for actuating the shutter to produce exposures; means for opening the shutter and holding it open for focusing; and a regulating device connected with both of said means for controlling the actuation of said shutter thereby.

10. In a photographic shutter mechanism, a shutter; shutter actuating mechanism comprising an operating lever, means for producing automatically-timed exposures, and means for opening the shutter and holding it open for focusing; and means for automatically locking said lever when the shutter is opened for focusing.

11. In a photographic shutter mechanism, a shutter; shutter-operating mechanism for producing time, bulb and automatically-timed exposures, including an operating lever, means for determining the desired exposure, and means for opening the shutter and holding it open for focusing; and means for automatically locking said lever when the shutter is opened for focusing.

12. In a photographic shutter mechanism, a shutter; mechanism for actuating the shutter to produce exposures including an operating lever; means for opening the shutter and holding it open for focusing; a regulating device for controlling the exposure mechanism; and means for automatically locking said lever when the shutter is opened for focusing.

13. In a photographic shutter mechanism, a shutter; shutter-operating mechanism including shutter actuating means, unitary means for both varying the exposure action of the shutter and controlling the opening and retaining open of the shutter for focusing, and means for locking the shutter-actuating mechanism when the shutter is open for focusing.

14. In a photographic shutter mechanism, a shutter, shutter-operating mechanism including means for producing automatically-timed exposures, unitary means for both varying the time of exposure and controlling the opening and retaining open of the shutter for focusing, and means for locking the shutter actuating mechanism when the shutter is so opened.

15. In a photographic shutter mechanism, a shutter, mechanism for actuating the shutter; shutter opening means for opening the shutter and holding it open for focusing; a regulating device for controlling the actuation of said shutter-actuating mechanism and for controlling the operation of the shutter-opening means; and means for preventing action of the shutter-actuating mechanism when the shutter is opened for focusing.

16. In a photographic shutter mechanism, a shutter, and means for producing time, bulb and auto-timed exposures, and for opening and holding open the shutter for focusing including a unitary, manually-operable member for both determining the desired exposure and controlling the opening and retaining open of the shutter for focusing.

17. In a photographic shutter mechanism, a shutter, and means for producing auto-timed exposures and for opening and holding open the shutter for focusing including a unitary, manually-operable member for controlling the action of the timing means and the opening and retaining open of the shutter for focusing.

18. In a photographic shutter mechanism, a shutter, means for producing exposures of different characters, means for opening and holding open the shutter for focusing; and a unitary, manually-operable member for both varying the action of the shutter-actuating means with respect to the character of the exposure, and controlling the opening and retaining open of the shutter for focusing.

19. In a photographic shutter mechanism, a shutter, means for causing various exposure actions of the shutter and for opening the shutter and retaining it open for focusing, said means including an operating lever for actuating the shutter to produce exposures and means for automatically locking said lever when the shutter is opened for focusing.

20. In a shutter mechanism, a shutter, means for producing time, bulb and automatically-timed exposures, means for opening and retaining open the shutter for focusing; unitary, manually-operable means for both determining the desired exposure and controlling the opening and retaining open of the shutter for focusing, and means for locking the shutter operating mechanism against exposure action when the shutter is so opened.

21. In a photographic shutter mechanism, a spring closed shutter; a master-lever for opening the shutter, having connections with the shutter including a slip-off device; a trip lever engaging the master-lever; an operating lever having a slip-off connection with the trip lever; and shutter-opening means including a controlling member which in certain positions varies the shutter action, and which controls the opening of the shutter for focusing.

22. In a photographic shutter mechanism, a spring closed shutter; a master-lever for opening the shutter, having connections with the shutter including a slip-off device; a trip lever engaging the master-lever; an operating lever having a slip-off connection with the trip lever; and shutter-opening means including a controlling member, which, in certain positions, varies the shutter action, and which controls the opening of the shutter for focusing, and also locks the operating lever when the shutter is so opened.

23. In a photographic shutter mechanism, a spring closed shutter; a master-lever for opening the shutter, having connections with the shutter including a slip-off device; a trip lever engaging the master-lever; an operating lever having a slip-off connection with the trip lever; a retarder mechanism for controlling the action of the master lever; and shutter-opening mechanism including a controlling member which, in certain positions, varies the action of the retarder mechanism, and in another position controls the opening of the shutter for focusing.

24. In a photographic shutter mechanism, a spring closed shutter; a master-lever for opening the shutter, having connections with the shutter including a slip-off device; a trip lever engaging the master-lever; an operating lever having a slip-off connection with the trip lever; a retarder mechanism for controlling the action of the master lever; and shutter opening mechanism including a controlling member which, in certain positions, varies the action of the retarder mechanism, and which controls the opening of the shutter for focusing, and also locks the operating lever when the shutter is so opened.

25. In a photographic shutter mechanism, a spring closed shutter; a master lever for opening the shutter; a trip lever engaging the master-lever; an operating lever for actuating the trip lever; and shutter-opening means including a controlling member which, in certain positions, varies the shutter action, and which controls the opening of the shutter for focusing.

26. In a photographic shutter mechanism, a spring closed shutter; a master-lever for opening the shutter; a trip lever engaging the master-lever; an operating lever for actuating the trip lever; and shutter-opening means including a controlling member which, in certain positions, varies the shutter action, and which controls the opening of the shutter for focusing, and which also locks the operating lever when the shutter is so opened.

27. In a photographic shutter mechanism, a spring closed shutter; a master-lever for opening the shutter; a trip lever engaging the master-lever; an operating lever for actuating the trip lever; a retarder mechanism; and shutter opening means including a unitary controlling member which, in certain positions, varies the retarder action, and which controls the opening of the shutter for focusing.

28. In a photographic shutter mechanism, a spring closed shutter; a master-lever for opening the shutter; a trip lever engaging the master-lever; an operating lever for actuating the trip lever; a retarder mechanism; and shutter-opening means including a controlling member which, in certain positions, varies the retarder action, and which controls the opening of the shutter for focusing, and also locks the operating lever when the shutter is so opened.

29. In a photographic shutter mechanism, a spring closed shutter; means for actuating the shutter to make exposures; separate opening means for the shutter; and movable means which in certain positions holds said opening means out of action, and varies the shutter action, and in another position permits the operation of said opening means.

30. In a photographic shutter mechanism, a spring closed shutter; means for actuating the shutter to make exposures; separate opening means for the shutter; and movable means which in certain positions holds said opening means out of action, and varies the shutter action, and in another position permits the operation of said opening means and locks said shutter-actuating means.

31. In a photographic shutter mechanism, a shutter, shutter-actuating means; a controlling lever; means controlled by said lever both for varying the exposure actions of the shutter and also for opening the shutter for focusing; an operating lever for said shutter-actuating means; and means for automatically locking said operating lever when the shutter is open for focusing.

32. In a photographic shutter mechanism, a shutter, shutter actuating means; a controlling lever; means controlled by said lever both for varying the exposure actions of the shutter and also for opening the shutter and retaining it open for focusing; an operating lever for said shutter-actuating means; and means for automatically locking said operating lever when the shutter is open for focusing.

33. In a photographic shutter mechanism, a shutter, shutter-actuating mechanism, a controlling lever; means controlled by said lever both for varying the exposure actions of the shutter and also for opening the shutter for focusing; and means for locking the shutter-actuating mechanism when the shutter is open for focusing.

34. In a photographic shutter mechanism, a shutter, shutter-actuating means; means both for varying the exposure actions of the shutter and also for opening the shutter for focusing; an operating lever for said actuating means; and means for automatically locking said lever when the shutter is opened for focusing.

35. In a photographic shutter mechanism; a shutter, shutter-actuating means; a controlling lever; means controlled by said lever both for varying the exposure actions of the shutter and also for opening the shutter for focusing; an operating lever for said shutter-actuating means; and means for automatically locking said operating lever when the shutter is opened for focusing.

ANDREW WOLLENSAK.

Witnesses:
D. GURNEE,
L. THOR.

---

Copies of this patent may be obtained for five cents each, by addressing the "Commissioner of Patents, Washington, D. C."